United States Patent [19]

Hayati et al.

[11] Patent Number: 5,086,400
[45] Date of Patent: Feb. 4, 1992

[54] BILEVEL SHARED CONTROL FOR TELEOPERATORS

[75] Inventors: Samad A. Hayati, Altadena; Subramanian T. Venkataraman, Cerritos, both of Calif.

[73] Assignee: The United States of America as represented the the Administrator of the National Aeronautics and Space Administration, Washington, D.C.

[21] Appl. No.: 522,949

[22] Filed: May 11, 1990

[51] Int. Cl.⁵ .............................................. G06F 15/00
[52] U.S. Cl. .......................................... 395/95; 901/6; 395/86
[58] Field of Search ............................................ 364/513

[56] References Cited

U.S. PATENT DOCUMENTS

| 4,432,063 | 2/1984 | Resnick | 364/513 |
|---|---|---|---|
| 4,510,574 | 4/1985 | Guittet et al. | 364/513 |
| 4,582,026 | 4/1986 | Takita et al. | 122/448 |
| 4,641,251 | 2/1987 | Inoue | 364/513 |
| 4,661,032 | 4/1987 | Arai | 364/513 |
| 4,737,697 | 4/1988 | Maruo et al. | 318/568 |
| 4,763,055 | 8/1988 | Daggett et al. | 318/368 |
| 4,837,734 | 6/1989 | Ichikawa et al. | 364/513 |
| 4,853,874 | 8/1989 | Iwamoto et al. | 364/513 |
| 4,860,215 | 8/1989 | Seraji | 364/513 |
| 4,942,538 | 7/1990 | Yuan et al. | 364/513 |

OTHER PUBLICATIONS

"Computer Control of Space-Borne Teleoperators with Sensory Feedback", S. Lee, G. Bekey and A. K. Bejczy, Jet Propulsion Laboratory, CIT, Pasadena, CA.
"Adaptive Hybrid Position/Force Control of Robot Manipulators" F. Pourboghrat, SIU, Carbondale, IL.
"Adaptive Force-Position Control for Teleoperated Manipulators", A. J. Koivo, Purdue University, Lafayette, IN.
T. B. Sheridan, Telerobotics—10th IFAC World COngress on Automatic Control, 27-31 Jul. 1987, Munich, FRG—pp. 1-12.
Dr. Melvin D. Montemerlo—Man-Machine Redundancy in Remote Manipulator Systems, Presented Jun. 27-Jul. 1, 1988—NATO Advanced Research Workshop Salo, Lago diGarda, Italy.
S. Hayati, et al.—The JPL Telerobot Manipulator Control and Mechanization System (MC)—1985—JPL/CIT, Pasadena, CA—J. Lloyd, McGill Univ., Montreal, Quebec.
Antal K. Bejczy, et al.—Universal Computer Control System (UCCS) for Space Telerobots—1987 IEEE International Conf. on Robotics & Automation—pp. 318-324.

(List continued on next page.)

Primary Examiner—Michael R. Fleming
Assistant Examiner—George Davis
Attorney, Agent, or Firm—Thomas H. Jones; John R. Manning

[57] ABSTRACT

A shared system for robot control including integration of the human and autonomous input modalities for an improved control.

Autonomously planned motion trajectories are modified by a teleoperator to track unmodelled target motions, while nominal teleoperator motions are modified through compliance to accommodate geometric errors autonomously in the latter. A hierarchical shared system intelligently shares control over a remote robot between the autonomous and teleoperative portions of an overall control system. Architecture is hierarchical, and consists of two levels. The top level represents the task level, while the bottom, the execution level.

In space applications, the performance of pure teleoperation systems depend significantly on the communication time delays between the local and the remote sites. Selection/mixing matrices are provided with entries which relfect how each input's signals modality is weighted. The shared control minimizes the detrimental effects caused by these time delays between earth and space.

58 Claims, 5 Drawing Sheets

OTHER PUBLICATIONS

John Lloyd et al.—Extending the RCCL Programming Environment to Multiple Robots and Processors—1988 IEEE Conf.—pp. 465-468.

Hayward and Paul—Robot Manipulator Control Under UNIX RCCL A Robot Control"C" Library—The International Journal of Robotics Research—pp. 94-111.

A. K. Bejczy, et al.—Controlling Remote Manipulators Through Kinesthetic Coupling, Computers in Mechanical Engineering, vol. 2, Jul. 1983, pp. 48-60.

M. H. Raibert, et al., Hybrid Position/Force Control of Manipulators, Journal of Dynamic Systems, Measurement & Control, 102 (Jun. 1981) pp. 126-133.

Wun C. Chiou, Sr., Space Station Automation III—Proceedings of SPIE—The International Society for Optical Engineering—Cambridge, Mass. 11/2-4/87, pp. 123-133.

BILEVEL SHARED CONTROL FOR TELEOPERATORS

Origin of the Invention

The invention described herein was made in the performance of work under a NASA contract, and is subject to the provisions of Public Law 96-517 (35 USC 202) in which the Contractor has elected not to retain title.

BACKGROUND OF THE INVENTION

1. Field of the Invention

The field of this invention is a robotic control system which shares autonomous and hand-controller commands.

2. Description of the Prior Art

Robotic manipulation research is still in its infancy, and present day manipulation systems (teleoperator or autonomous) suffer from many weaknesses.

Consider, for example, the teleoperator systems that are currently used in space applications. Because of the time delay in transmission of signals, terrestrial teleoperators must be predictive in sending commands to the robot. One solution is to employ teleoperation in space. This solution, however, poses many problems in cost and practicality. Moreover, if teleoperation were to be done in space (from a shuttle, for example) the time delay problem would be overcome; but then mission time would be restricted according to the study reported by Montemerlop, Merlin D., *The Space Perspective: Man-Machine Redundancy in Remote Manipulator Systems*, Keynote Speech, NATO Advanced Research Workshop on Robots with Redundancy: Design, Sensing & Control, June 27–July 1, 1988, Salo, Lago di Garda, Italy.

With existing technologies, autonomous systems are incapable of accommodating large un-modelled variations. Moreover, since many problems in space applications are often detected, diagnosed and solved through human on-the-spot initiative, the presence of a human in the active loop becomes imperative. See Montemerlop, Merlin D. supra. We, therefore suggest (as many others have done) that the development of systems under shared control is of paramount importance in our attempt to automate space applications.

It is our observation that much of the research in shared systems, lacks a strong theoretical flavor. Effort has been directed towards building systems and implementing shared control at the servo-level. These systems consider the teleoperator as the master, record her actions in a teleoperative device, and then directly transform them into robot commands, which finally get executed under autonomous control. See, for example, Sheridan, T. B., *Telerobotics'*, *Workshop on Shared Autonomous & Teleoperated Manipulator Control*, 1988 IEEE International Conference on Robotics & Automation, Apr. 24–29, Philadelphia, PA.

The Sheridan article provides a splendid historical perspective about research in telerobotics, and many shortcomings in the scenarios described above come to light in that article. Most importantly of these shortcomings, is the absence of active human intelligence that should be involved during an integration of autonomous and teleoperator inputs. By this we mean that a theory of how to intelligently share control, prior to this invention, has not yet been firmly established. The lack of an effective shared control places the responsibility of maintaining stability squarely on the shoulders of the teleoperator. This responsibility is fine for terrestrial experiments (in nuclear power plants or for prosthetics), but not for space applications.

There exist classes of applications for which attempting to build a robotic system that is either purely teleoperative or completely autonomous may be self defeating. Such self-defeating applications include, for example, automating small batch jobs in space involving satellite maintenance and repair. The motivation of this invention is to exploit the power of each system and integrate them into a single man-machine system. Such shared systems will have the capability of accepting commands from a high level planner and/or a teleoperator, and appropriately mixing them.

Other shortcomings exhibited by our present teleoperator systems are as follows. The teleoperator, often requires explicit knowledge of the relationship between her actions and that of the robot. And, in general, it is very tiresome for the operator to impart fine motions to the robot.

A search of the prior art was done for the purpose of evaluating this invention. The results of that search are as follows:

Daggett el al., U.S. Pat. No. 4,763,05
Takita et al., U.S. Pat. No. 4,582,026
Resnick, U.S. Pat. No. 4,432,063
Guittet el al., U.S. Pat. No. 4,510,574
Maruo et al., U.S. Pat. No. 4,737,697
Inoue, U.S. Pat. No. 4,641,251

Inoue discloses a divided control system in which a main control 5 is in parallel with subcontrol units, such as units 6. Such subcontrol units are used to immediately stop the robot when an unexpected obstacle is encountered. The robot is provided with a number of such subcontrol units for individually controlling each operating portion so that a high response speed is achieved if an unexpected obstacle is encountered. See Col 2, lines 40 through 56 and FIG. 2.

Guittet et al discloses proportioning of force control between a master actuator and a slave actuator by each transmitting to a control device of the other a position and/or speed signal with a transmission delay. The transmission delays are compared and a sum of the delay times is used in a first force control loop that is supplemented by a second control loop. The system's second control loop includes a second force signal that is related to the delay times being sensed. See FIG. 6 and Column 10, lines 39 through 58 where it is described as a desire of the patent to use the most appropriate configuration of the invention, based upon the delay time summation.

Maruo et al is typical of those types of systems that employ a teaching mode and a playback mode. During the teaching mode a servo is disabled and then is enabled again in the playback mode. See the abstract.

Takita et al discloses an anticipatory control system in which each point of operation can be changed over individually on the basis of a driving control instruction for a sub-loop controller associated with each operating point. See FIG. 2 for the master controller 10 and the subloop controllers such as 11a, 11b, etc.

The Daggett et al system is typical of those that operate on a cascaded control approach in which processors are individually assigned data processing and calculation tasks. These individual processors respond to extended control and basic control as shown in FIGS. 4 and 5 and as described at Column 8, lines 37 through 48.

Resnick is of interest for its disclosure of robot control over nonprogrammed and programmed points. In summary then, none of these references are deemed of significant relevance to this invention.

We conclude this background section by putting the above-described state of the art in context with some other basic background art. In an article by Sheridan, T. B., entitled *"Telerobotics"*, *Workshop on Shared Autonomous & Teleoperated Manipulator Control*, 1988 IEEE International Conference on Robotics & Automation, Apr. 24–29, Philadelphia, PA. four major areas are specified as requiring research that must be done in telerobotics. The four areas include: (i) telesensing, (ii) teleactuation, (iii) computer-aiding in control and, (iv) meta analysis of task interactions. This invention focuses on some important aspects of areas (ii) and (iv) and additionally shows how these aspects relate to each other. Such aspects are also reflected in a somewhat similar hybrid position/force task representation, used for low-level tasks, as described in an article by De Schutter J., Van Brussel H., entitled "Compliant Robot Motion, I.A. Formalism for Specifying Compliant Tasks", *International Journal of Robotics Research*, Vol. 7, No. 4, August 1988.

SUMMARY OF THE INVENTION

An important issue that must be addressed in the development of shared systems is the actual integration of the human and autonomous input modalities as first taught, described and claimed in this our invention. Two approaches may be taken towards this; either the nominal autonomous behavior may be modified by a teleoperator, or nominal teleoperator behavior may be modified autonomously. For example, autonomously planned motion trajectories will be modified by a teleoperator to track unmodelled target motions in the former, while nominal teleoperator motions will be modified through compliance to accommodate geometric errors autonomously in the latter.

Ideally, one would like teleoperators to be terrestrial (based on ground) and operate robots located at remote sites with full confidence that execution will be accurate and reliable. At the execution level, these two desirable features can be obtained through a systematic design of controllers. At the task level, one way of achieving such features is to follow an integration philosophy that results in a shared system which has all the positive features of pure teleoperation and pure autonomy, and none of the negative features. We submit that our invention contributes a major step towards this "ideal" goal, and it lies in mixing the teleoperator and autonomous inputs in an advantageous, new and novel manner.

More specifically, this invention relates to a hierarchical shared system, and describes and claims a novel approach for intelligently sharing control over a remote robot between the autonomous and teleoperative control systems. In this patent application, we present a shared control architecture compatible with both approaches and discuss in detail some of the implementation issues.

The architecture that we present in this application is hierarchical, and consists of two levels. The top level represents the task level, while the bottom, the execution level. Inputs to our architecture are formulated in a task coordinate system and consist of the following: (1a) a specification of a task coordinate system and (1b) task trajectories, and (2) the teleoperator trajectory. A hybrid position/force task representation is used for low-level tasks. Therefore, the task coordinate system consists of orthogonal motion and force coordinates, task and teleoperator trajectories, of appropriate motion and force trajectories. Teleoperator signals are transformed from its local coordinate system (in our architecture, this is called the hand controller system) to the task coordinate system.

In space applications, the performance of pure teleoperation systems depend significantly on the communication time delays between the local and the remote sites. The philosophy behind any sharing of control must therefore be based on minimizing the detrimental effects caused by these time delays.

Our inventive approach is as follows. At the task level, should the communication delay be significant, we allow integration only along motion directions, while forces are controlled autonomously. A significant first step in the integration process, in accordance with our invention, consists therefore of deciding what signals are to be mixed, followed by the decision of when such signals may mix. Another important step is to decide how such signals may be mixed. These steps are done with the help of selection and mixing matrices. Entries in such matrices reflect how each input's signals modality is weighted.

At the execution level, the system is oblivious to the nature of the desired trajectory, and it may come directly from the autonomous part, teleoperator part, or the desired trajectory may be a mixture of the two. The servo controller is simply capable of tracking motion and/or force trajectories in a stable fashion. For the hybrid task representation of our invention, we choose a hybrid force/motion control architecture for servocontrol. Also it should be noted that the flexibility of our invention accommodates different task representations that may result in different control architectures.

DESCRIPTION OF THE PREFERRED EMBODIMENT

A novel robotic control system comprises two levels of control circuitry whereby the system will accept and execute autonomous or hand-controller commands, sharing control between them such that shortcomings and limitations of one mode of control may be overcome by the other. These two levels are represented as a task level and an execution level.

At the task level, should the communication time delay between local and remote sites (experienced in space application) be significant, integration is used only along motion directions, while forces are controlled autonomously. The first step in integration consists of decision logic that determines when the control signals may mix and the second step is deciding how the signals may mix.

A novel application of a mixing matrix is employed in which input modality is weighted.

The invention will now be described in more detail in the following sections.

I. SHARED CONTROL

Figure 1:
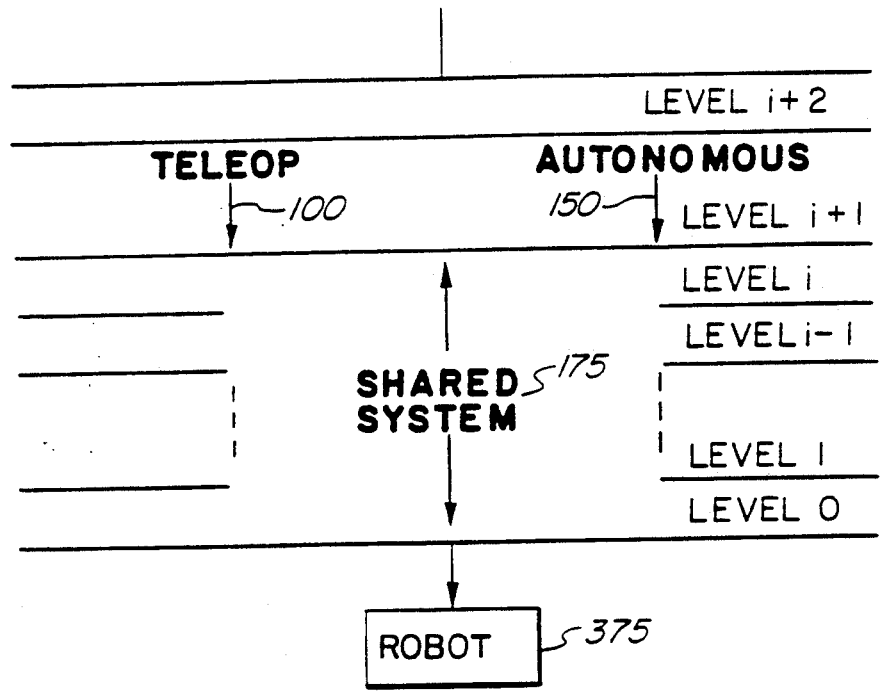
FIG. 1 is a figure depicting a hierarchical system in accordance with the invention.

Consider a hierarchical robot system shown in FIG. 1. In a shared system, any level i must be capable of accepting commands from both autonomous and teleoperative sources, and must allow this acceptance at multiple levels. If inputs from both teleoperation 100 as well as the autonomous system 150 arrive at level i, as shown in FIG. 1, then all levels from 0 to i come under shared control of shared system 175.

Figure 2:
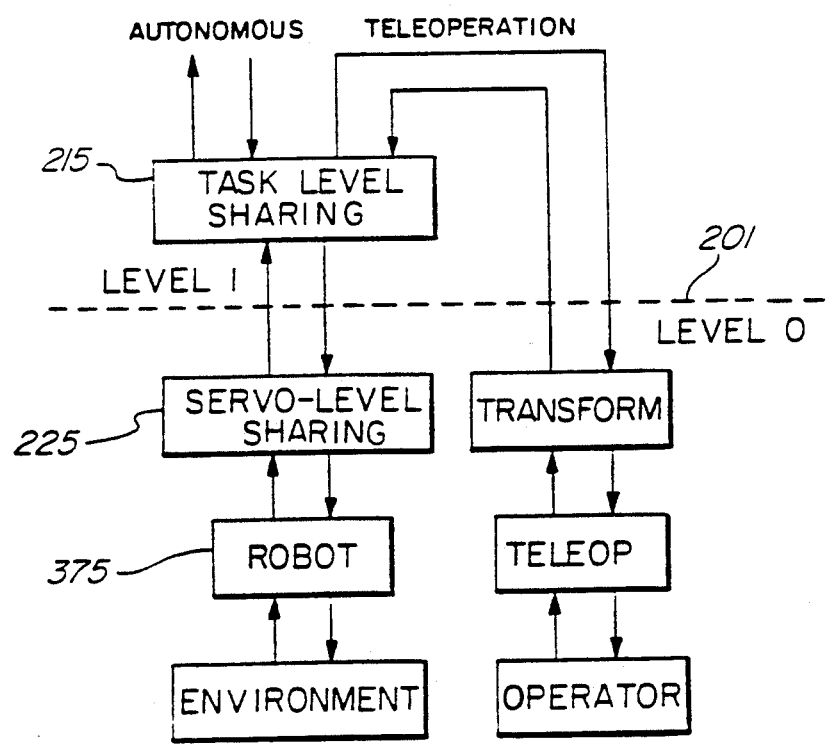
FIG. 2 is a figure depicting a shared system architecture in accordance with the invention.

The system approach for this invention is depicted in FIG. 2. It consists only of two levels, namely level 0 and level 1 shown on opposed sides of the dashed line 201. Level 0 is the servo control level, and accepts tool motion/force commands and runs them on the robot. Level 1 generates the motion/force commands.

Sharing occurs at both levels, in general. At the task level, sharing occurs in the task-level sharing circuit 215, while at the servo-level it occurs in servo-level sharing circuit 225.

We draw upon the ongoing research in the development of hierarchical autonomous robot systems to describe some of the details of the architecture shown in FIG. 2. At level 1 robotic task-level commands are generated, and we therefore denote that level as the task level. Level 0 executes the task and so it is denoted the execution level.

In this patent application, the word task is used in a local sense and denotes the generation of two pieces of information, (i) a task coordinate system, and (ii) desired trajectories of the task coordinates. To integrate teleoperator inputs with its autonomous counterpart, these inputs must be compatible, and so, if necessary, primitive arm/hand teleoperator actions must be transformed into an appropriate task coordinate system.

The task coordinate system is dependent on the representation of tasks. Our task representation framework is similar to that described by: De Schutter J., Van Brussel H., *Compliant Robot Motion, A Formalism for Specifying Compliant Tasks*, International Journal of Robotics Research, Vol. 7, No. 4, August 1988. The task coordinate system consists of orthogonal motion and force coordinates. The origin of this system is generally located at the arm endpoint (location of the contact) in the absence (presence) of contact. We assume that desired autonomous motion/force trajectories are readily available to us.

At the execution level, we use a hybrid force/motion control scheme disclosed by: Raibert, M. H., & Craig, J. J., *Hybrid Position/Force Control of Manipulators*, Journal of Dynamic Systems, Measurement & Control, 102 (June 1981), 126–133.

For space applications, the proposed hierarchy (in FIG. 2) needs additional structuring. This is due to the fact that some of the planning/control/sensing actions are done locally on the earth (or in space but physically far away from the location of the robot system), while others are done remotely by the robot system itself. In such a scenario, explicit sharing at the servo level may not be practical because of the time delays in communication.

Figure 3:
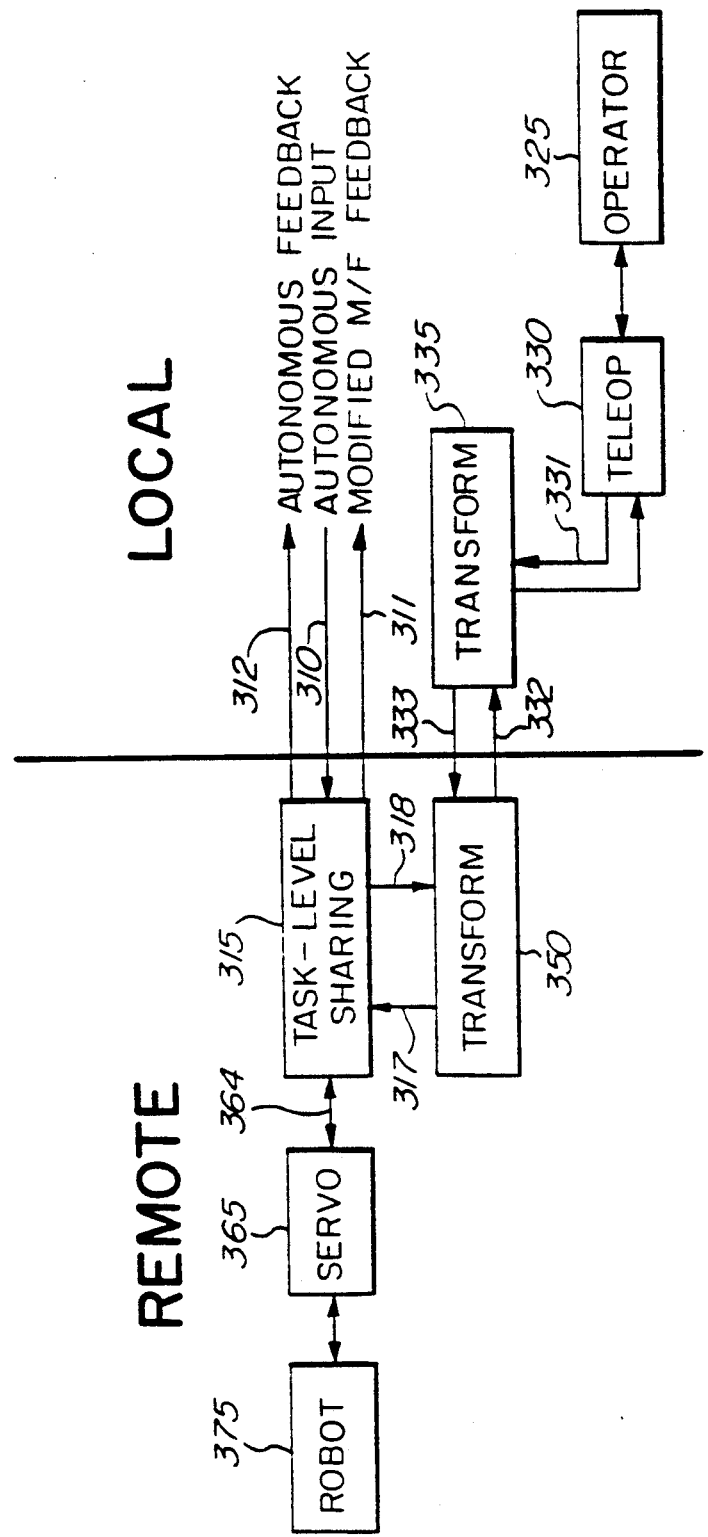
FIG. 3 is a figure depicting a shared space system architecture in accordance with the invention.

FIG. 3 shows the hierarchy in FIG. 2 with some modifications. The servo-level sharing circuitry 225 of FIG. 2 has been removed completely. In addition, we show that both task and servo-level operations have now been distributed over the remote and local sites. At the local site, a planner develops a series of task-level autonomous commands. These locally-initiated commands are transmitted over line 310 to the robot system located at a remote site, where such commands are received by a task-level sharing circuit 315.

Meanwhile, the teleoperator 325, acquires information about (i) robot motions through TV displays, and (ii) the contact and inertial forces through force reflectance in any well known manner (not shown in FIG. 3). She compares the acquired information with her perception of the task, and generates teleoperative inputs 330 to perform the appropriate corrections. The teleoperative inputs are applied over line 331 to transformation circuitry 335. Transformation circuitry 335, in turn, sends these commands over line 333 to the remote location.

The actual transformation of teleoperative inputs at line 331 into the task coordinate system happens partly at the local site (circuitry 331, 335) and partly at the remote site in transformation circuitry 350. At the local site, primitive device specific actions are first converted at 335 to some local coordinate system by a hand controller, or other suitable conversion device (not shown). Then, those converted signals are transformed to a coordinate system attached to a reference location such as the base of the robot (the reference location, of course, will be known from past information) and then such coordinate information is transmitted to the remote site over line 333.

At the remote site, the inputs are transformed from the base of the robot to the task coordinate system by the remote transformation circuitry 350. Transformations from base to task frame is done at the remote site because the robot's joint angle information will be the most up-to-date at that location. Task-level sharing occurs completely at the remote site, as does the servo-control by servo system 365 for robot 375.

The architecture presented in FIG. 3 is implemented in this invention and is described in more detail with reference to FIGS. 4, 6, and 7. Such description will be given after a discussion of notation to be used in the description.

The notation used in this description is as follows:

I = Input
O = Output

The first subscript of I or O indicates the hierarchical level. The second subscript indicates the source of the signal (T for teleoperator, A for autonomous and S for shared). Therefore, $I_{ij}$, for $i = 1, \ldots, n$ & $j = T, A, S$
$O_{ij}$, for $i = 1, \ldots, n$ & $j = T, A, S$ are the generalized expressions for the various inputs and outputs. In addition, sharing is represented by C and transformations are represented by T. With these understood, we define the following:

$^i_jT$ = Transformation of information from coordinate system $i$ to $j$ $C_i$ = Sharing at level $i$ Task-level sharing, ($C_1$), is discussed in section II which follows. In section III we discuss the transformation $$^1_0T$$

of teleoperator commands to the task frame, and present the necessary control architectures for hybrid position/force control

II. TASK LEVEL

We now describe the task level of our shared control architecture in greater detail. The issue that needs to be addressed at this level is how the teleoperator and autonomous inputs (both expressed in the task coordinate system) will be combined. That is, how do we develop $C_1$ (the signals issuing from task-level sharing 315 in FIG. 3)?

Figure 4:
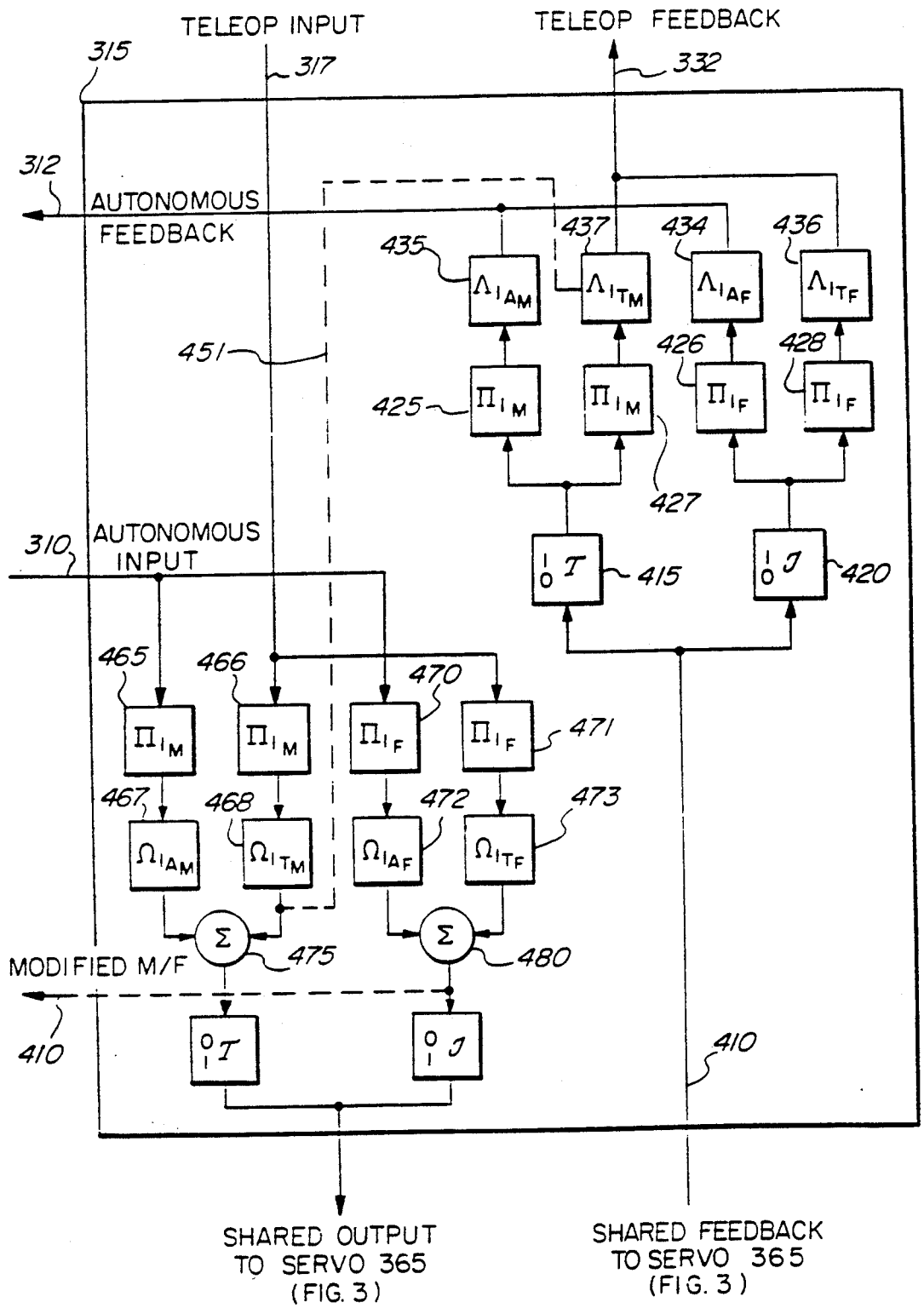
FIG. 4 is a figure depicting a remote site task sharing in accordance with the invention.

The details of circuit 315 are shown in FIG. 4 where the FIG. 3 input/output connections from FIG. 3 are repeated. Note in FIG. 3 that the autonomous input 310 is from the local site location to the sharing circuit 315 and the two return signals are a modified motion/force feedback 311 and an autonomous feedback 312. Those leads are also shown in FIG. 4 for ease of comparing the two figures.

In FIG. 4, in the lower left-hand portion of the circuitry, the teleop input and the autonomous input terms are weighted by a series of matrices 465 through 468 and 470 through 473. The weighted values are summed in summation circuits 475 and 480 and a modified motion/force signal, as a result of such weighing and summing, is developed on output lead 410 for application to the servo control 365. The manner of modification is a significant feature of this invention and requires further explanation after digressing briefly for some background information.

The most important factor that affects the development of C is the transmission delay that exists between a teleoperator and the robot system itself. For terrestrial teleoperation (ground based operator) this delay time is of the order of a few seconds, and implies that modifications on the nominal trajectory will occur with a significant delay. In addition, the information obtained by the operator about the state of the robot will be obsolete, and so, her modifications are at best outdated, or may even be downright invalid. Sharing at the task level must therefore minimize these detrimental effects.

In general, robots may operate in one of three modes. They may either be moving freely, or just about to establish contact, or else, may have already established stable contact. In the first case, although the transmission delay causes the robot to deviate away from its desired path, and the obsolete feedback information results in errors in the specification of the desired path, the system's stability is never affected. However, in the third case, and very often in the second case (if the contact surface is very close), instabilities are generated in the system from both transmission delay as well as obsolete feedback information.

One way to reduce the above-mentioned undesirable features in a shared system is to allow nominal task trajectories generated by an autonomous system to be affected by the teleoperator only in those directions where contact is not established, and perform force control autonomously. At the task level, our sharing strategy can be summarized as follows. Let the motions and forces allowable by the contact type (See the notation developed by Salisbury, J. K., *Kinematic & force Analysis of Articulated Hands*, Ph.D thesis, Department of Mechanical Engineering, Stanford University, 1982) be represented by $6 \times 1$ vectors M and F. Let M (i) represent the $i^{th}$ row of M. Then:

$$M(i) = 1, \text{ if motion freedom exists}$$
$$= 0 \text{ otherwise}$$

Similarly, F(i) is 0 or 1 depending on whether force freedom in that direction exists or not. For a hybrid task representation:

$$F^TM=0$$

Also, let $^aM$ and $^aF$ represent desired motion and force trajectories expressed in the task coordinate system be represented by $$^t_bT,$$

and the corresponding Jacobian, $$^t_bJ.$$

A. Feedforward Path:

In the feedforward path, the input and output signals at the task level, FIG. 4, will consist of the following components:

Autonomous Input (at 310) $(I_A) \leftarrow (^t_bT, \ ^t_bJ, M, F, (a_{AM}), (a_{AF}))$ Teleoperator Input (at 317) $(I_T) \leftarrow (a_{TM}, a_{1TF})$ Shared Output (at 364) $(O_S) \leftarrow (a_{SM}, a_{SF})$ where ← indicates what information is contained in the command.

The mapping of $I_A$ and $I_T$ onto $O_S$ occurs as follows. Let $\pi_M$ be a $6 \times 6$ matrix 465, 466 (and $\pi_M(i,i)$ the element at its $i^{th}$ row and column). For the degrees of motion freedom the $\pi$ matrices in FIG. 4 are derived as follows:

$$\Pi_M(i, i) = 1, \text{ if } M(i) = 1$$
$$= 0 \text{ otherwise}$$
$$\Pi_M(i, j) = 0, \text{ when } i \neq j$$

$\pi_F$ for force matrix elements 470, 471 can be constructed similarly.

$$\Pi_F(i, i) = 1, F(i) = 1$$
$$= 0 \text{ otherwise}$$
$$\Pi_F(i, j) = 0, \text{ when } i \neq j$$

Thus the $\pi$ matrices reflect the effect of task representation on sharing. Through this novel approach, we are able to specify what is being mixed along a particular direction. The question of how the actual sharing occurs is resolved through the weighing matrices $\Omega$ shown as elements 467, 468 (motion) and 472, 473 (force) in FIG. 4. The $\Omega$ matrices are determined as follows ($\Omega(i,i)$) is the element located at the $i^{th}$ row and column.

Now in M and F, some directions may be chosen for operation under pure teleoperation or pure autonomy. Let these be denoted by $6 \times 1$ vectors $G_T$ and $G_A$. Therefore, ($G_T(i)$) ($G_A(i)$) is equal to 1 if and only if pure teleoperation (autonomous control) is intended in the direction i. With these, we define the elements of the $\Omega$ matrices as follows:

$$\Omega_{AM}(i, i) = W_{iM}; \text{ if } M(i) = 1 \text{ \& } G_T(i) \neq 1$$
$$= 0; \text{ otherwise}$$
$$\Omega_{AM}(i, j) = 0; \text{ for } i \neq j$$

$$\Omega_{TM}(i, i) = (1 - W_{iM}); \text{ if } M(i) = 1 \text{ \& } G_A(i) \neq 1$$
$$= 0; \text{ otherwise}$$
$$\Omega_{TM}(i, j) = 0; \text{ for } i \neq j$$

$$\Omega_{AF}(i, i) = W_{iF}; \text{ if } F(i) = 1 \text{ \& } G_T(i) \neq 1$$
$$= 0; \text{ otherwise}$$
$$\Omega_{AF}(i, j) = 0; \text{ for } i \neq j$$

$$\Omega_{TF}(i, i) = (1 - W_{iF}); \text{ if } F(i) = 1 \text{ \& } G_A(i) \neq 1$$
$$= 0; \text{ otherwise}$$
$$\Omega_{TF}(i, j) = 0; \text{ for } i \neq j$$

where, W denotes the weight entries in the matrices. Note that the $\Omega$ matrices will, in general, be diagonal.

With these stated conditions, sharing in the feedforward path occurs as given below:

$$A_{SM} = {}^0_1 T [\Omega_{AM} \Pi_{M} \alpha_{AM} + \Omega_{TM} \Pi_{M} \alpha_{TM}] \quad (1)$$

$$A_{SF} = {}^0_1 T [\Omega_{AF} \Pi_{F} \alpha_{AF} + \alpha_{TF} \Pi_{F} \alpha_{TF}] \quad (2)$$

Equations (1) and (2) completely determine C in the feedforward direction with summing taking place in summation circuits 475 and 480.

Note that pure autonomy and pure teleoperation can be effected within the same architecture by setting W equal to 1 and W equal to 0, respectively.

B. Feedback Path

In the feedback path of FIG. 4, actual robot motions/forces are input into the task level sharing circuitry at 410 from servo 365 in FIG. 3. This information is used to generate motion/force feedback applied by lead 312 to an autonomous task planner, as well as force reflective feedback 332 to the teleoperator. We now explain each of the feedback signals in FIG. 4 in more detail.

In FIG. 3, we show a signal denoted modified M/F at line 311, which signal is fed back to an autonomous planner at level 2 (See FIG. 1). The signal represents the shared desired motion/force trajectory $0_{1S}$. The reason for this feedback is given in the following discussion.

The autonomous planner expects the system to track only the autonomous part $I_{1A}$. This expectation would result in an incorrect reasoning (upon completion of the task) by the planner. In short, the autonomous planner does not know that the actual signals that are controlling the robot have been a shared command.

What is really being tracked, of course, is not solely an autonomous input command. Note that the autonomous planner would conclude that the task execution has failed unless a mechanism for dealing with the sharing command is provided. One way to rectify the above-described incorrect conclusion is to modify the task specification of the autonomous task planner from $I_{1A}$ to $0_{1S}$. Note that under pure teleoperation, the task planner specifications are derived from the teleoperator completely.

Figure 5:
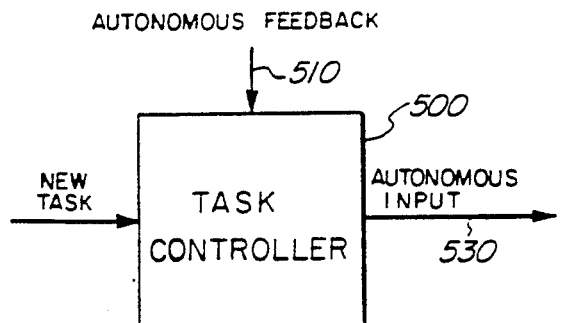
FIG. 5 is a figure depicting a task controller in accordance with the invention.

Note also that at level 2 of FIG. 1, there is an autonomous task controller 500, FIG. 5, into which the autonomous feedback 510 and modified M/F signals 520 are fed back. Based on these items of feedback information, and depending on the next task plan that it receives from a high level task planner, the task controller 500 generates appropriate autonomous inputs for the next task. These inputs are applied at line 530 by task controller 500 as is shown in FIG. 5.

The actual robot motions/forces may be generated at the servo level in a coordinate system different from the task coordinate system. For example, the robot motions may be expressed in terms of the robot's joint space in any well known manner. Therefore, in general, the feedback information needs to be transformed to the task coordinate system.

These required transformations are performed by $${}^1_0 T$$

(element 415) and $${}^1_0 \Im$$

(element 420) respectively in FIG. 4.

Note that the shared feedback signals appear on line 410 and are applied to the transformation circuits 415 and 420, respectively. These transformation circuits, as described above, convert the incoming joint space information to the task coordinate system's notation. The $\pi$ matrices for motion, elements 425 and 427, connected to the output of circuit 415, are identical in the feedback path while the weighing matrices 435, 437 that are receiving the output terms are different.

In a similar manner, transformation circuit 420 applies its output to the $\pi$ matrices 426 and 428 for force weighing. Those matrices, in turn, are connected to weighing matrices 434 and 436.

We now develope the mathematical relationship for signal weighing by the matrices 435, 437 and 434, 436. These mathematical relationships are as follows:

$$\Lambda_{AM}(i, i) = 1; \text{ if } M(i) = 1$$
$$= 0; \text{ if } M(i) = 0$$
$$\Lambda_{AM}(i, j) = 0; \text{ for } i \neq j$$

-continued $$\Lambda_{AF}(i, i) = 1; \text{ if } F(i) = 1$$
$$= 0; \text{ if } F(i) = 0$$
$$\Lambda_{AF}(i, j) = 0; \text{ for } i \neq j$$

$$\Lambda_{TF}(i, i) = \lambda_{iF}; \text{ if } F(i) = 1$$
$$= 0; \text{ if } F(i) = 0$$
$$\Lambda_{AF}(i, j) = 0; \text{ for } i \neq j$$

where $\lambda_i$ reflects the scaling factor between the actual forces generated and the force that the teleoperator is intended to feel. Note that this is how we, in accordance with our invention, have force reflectance of the actual forces to the operator. This force reflectance may be openloop, where the operator just feels the contact forces, or closed-loop where the operator can effect changes in the desired contact force through teleoperation. The latter case is allowed only when the time delays are insignificant.

Generally speaking, the term $\Lambda TM$ is actually very complex. We have provided a connection between the matrix 437 and the input to summing junction 475 in FIG. 4. This connection accomplishes a multifold purpose for the term $\Lambda TM$.

The purpose for the $\Lambda TM$ term is twofold. First, it must enable the teleoperator to experience the inertia of the robot system at the remote site. Through this the operator gets a sense of how the robot is behaving. In addition, it enables the operator to adapt to the inertial characteristics of the robot system, so that the operator learns how best to teleoperate the robot 375. For example, in the presence of contacts along directions of contact forces, we simply reflect the actual forces back to the operator (with a scaling factor), as explained above. Along directions of motions, however, we obtain the difference between the desired and actual teleoperator trajectories, and use this difference information to inform the operator about the inertial characteristics of the robot.

We explain the actual methodology behind the above-described virtual force reflectance in the next subsection. Suffice it to say at this point, however, that at the task level, in order to obtain the existing errors in teleoperation, we must extract out of the actual motions under shared control, the contributions due to teleoperation.

Although the shared input signal $0_S$ at lead 410 is a linear combination of autonomous and teleoperator trajectories, the non-linearities in the robot system itself (and possibly also in its controllers, if non-linear controllers are employed) makes is very difficult to perform this extraction. We therefore restrict ourselves in a mathematical development to a simple case in this patent application. The general case is valid, however, and is within the scope of the appended claims, and is covered in our invention.

Let us develope for the simple case;

$$(G_A)^t G_T = 0$$

$$G_A U G_T = S_M$$

where, U indicates a union operation and $S_M$ represents the space of motions allowable by M. In this case, teleoperative and autonomous motions are in the orthogonal directions, and so, $\Lambda TM$ will be:

$$\Lambda_{TM}(i, i) = 1; \text{ if } M(i) \times G_T(i) = 1$$
$$= 0; \text{ otherwise}$$
$$\Lambda_{AM}(i, j) = 0; \text{ for } i \neq j$$

Note that the actual robot trajectory under shared control is then multiplied by the appropriate A matrix, and then subtracted from the desired to obtain the difference. The difference is then shipped out to the local site. Output signals from the A matrices are six element vectors. For example, if the motion output information is expressed in three digits the first three places are motion information followed by three zeroes in the last three digit places. For the force side the opposite condition is true, with the last three places containing force information while the first three digit places are filled with zeroes. A combined six digit signal is then developed at the autonomous feedback line 312.

To summarize, in this subsection, we have described in detail how teleoperative and autonomous inputs will be integrated at the task level.

III. SERVO LEVEL

At the servo level, three functions have to be performed in the feedforward path. The first is the actual execution of the commands issued from the task level. This function will be accomplished by any standard servo operation through equipment that is well known and located entirely at the remote site. The second function is to take the raw teleoperator input signals and convert such signals to a coordinate system attached to the device itself. This function is also accomplished by equipment that is well known and is located entirely at the local site. In connection with this second function, device-specific commands are shipped out to the robot system from the remote site. The third function is to perform the transformation of feedback information at the remote site to the appropriate task level coordinate system.

In the feedback path, the functions are almost identical. The only exception is that at the local site, in addition to performing the transformations between device coordinate system and the actual input device, there must also be a servo-loop in the force reflectance path.

Figure 6:
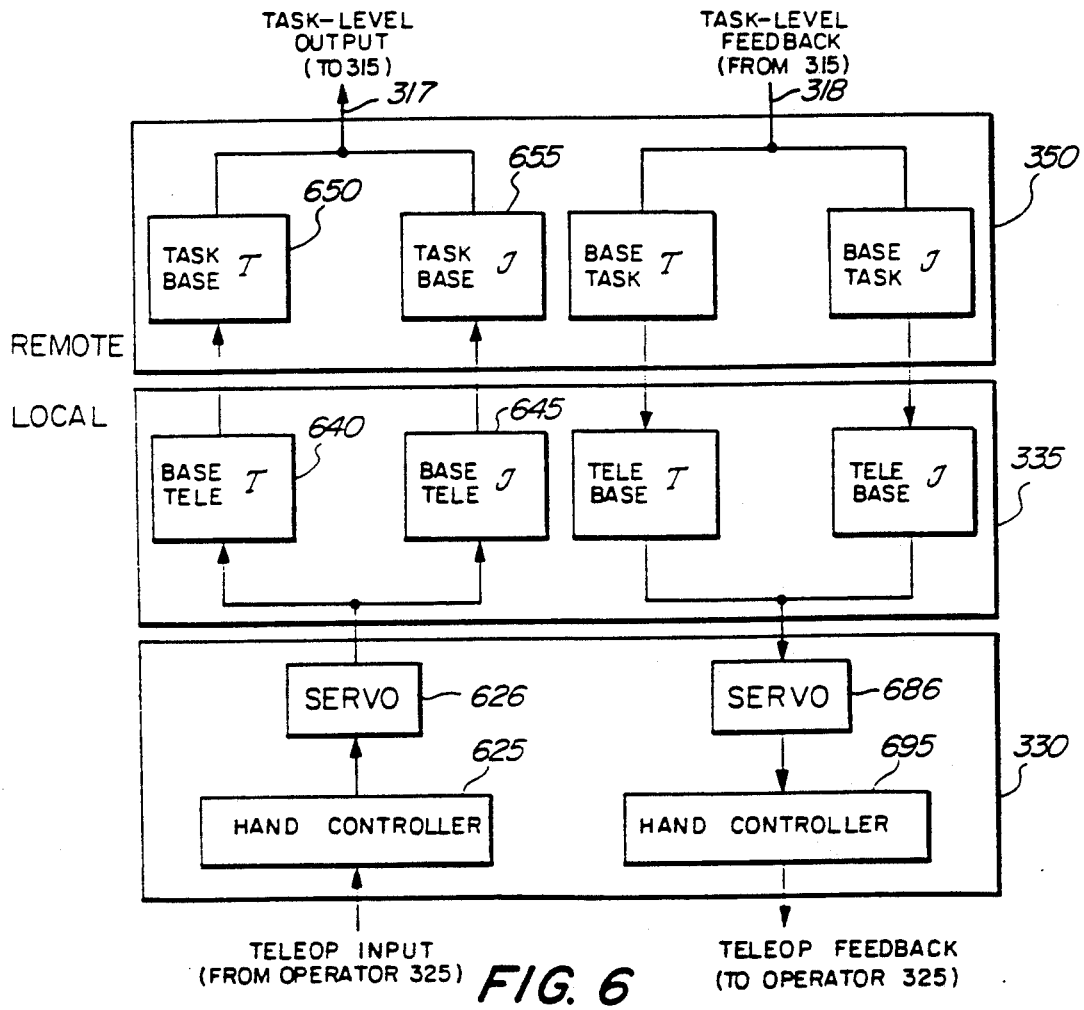
FIG. 6 is a figure depicting a teleop-task transformation in accordance with the invention.

We will now explain the above-mentioned features in more detail by reference to FIG. 6 which shows both the feedforward and feedback paths from and to the teleoperator. It should be recalled from FIG. 3 that an operator 325 will supply a teleoperator input to a hand controller. Such a hand controller, shown in FIG. 6 as hand controller 625, is connected in standard fashion to a servo system of any known type.

The servo 626 will convert the teleop inputs into a signal format that is acceptable by transformation circuitry 335. Such transformation circuitry includes a pair of transformation circuits 640 and 645 (local site), and another pair of transformation circuits 650, 655 (remote site) each of which are devoted to motion (T) and to force ($\mathfrak{F}$) respectively in accordance with our invention.

As one reviews the circuitry of FIG. 6, it is readily apparent that the left-hand side and the right-hand side of the figure are images of each other with the outbound or feedforward part on the left and the inbound or feedback part on the right. Description of one side is mostly self explanatory of the reverse direction that occurs in the other side. The transformation of the parameters at T and at are described in the subsections hereinafter.

A. Determination of T

The transformation between task-level and the teleoperation-level occur in the boxes denoted transform 335 (local site) and transform 350 (remote site) as shown in FIG. 3. Once C has been determined at the task level, determination of this transformation is straightforward.

Transformations of the teleoperator motions to the task coordinate system are required as long as at least one degree of motion freedom exists. Therefore, the matrix $$^{task}_{teleop}T$$

is required. This will in general vary with the locations of the task frame, and so requires information from higher level planning system for its construction.

In addition, if teleoperation is allowed along force direction, then the jacobian $$^{task}_{teleop}$$

would also be required. Similar arguments can be used for the feedback path. Thus in FIG. 6, we see that the kinematic transformations $$^{base}_{tele}T \text{ and } ^{task}_{base}T$$

in the feedforward path are done at the local and remote sites respectively. Similarly for $$^{tele}_{base}T \text{ and } ^{base}_{task}T$$

in the feedback path. The forces are transformed through the corresponding Jacobians, $$^{base}_{tele}\Im \text{ and } ^{task}_{base}\Im$$

in the feedforward path, and $$^{tele}_{base}\Im \text{ and } ^{base}_{task}\Im$$

in the feedback path.

In general, the teleoperator device itself has a very small motion limit. Therefore, each teleoperator input indicates the incremental change necessary in the autonomous trajectory. The rate at which a local processor within the hand controller samples the raw device signal and converts it to hand controller specific motions may, in general, be an order of magnitude faster than the rate at the task-level.

The above implies that the small incremental changes specified by a teleoperator will have to be accumulated and stored in order to generate the teleoperative commands at the task level. In our implementations (although not explicitly depicted in any figure) this is assumed to be done at the remote site.

B. Teleoperation unit

The transformation of motions of the input devices in the teleoperation hardware to small incremental motions in a teleoperator device specific cartesian coordinate system, occurs in the feedforward path in servo 626 in FIG. 6. The box denoted hand controller 625 represents the teleoperation hardware. The hardware not only contains encoders to read the motions of the input device, but also motors that can be actuated.

In the feedback path, the servo box 686 drives these motors against the operator to provide her with force reflectance in a manner well known in this art. Such force reflection can occur in two cases: (1) when there is negligible transmission time delay between the local and the remote sites. In this case actual forces from the remote site can be fed back to the operator and thus the control loop is effectively closed through the operator. And (2) when there is enough transmission time delay, only the motion subspace is directly controlled by the operator. In this latter case the motion errors in teleoperation, supplied from the task-level, are first multiplied by a stiffness matrix to generate virtual inertial forces, and then added to the actual contact forces.

The actuators drive the operator back (or forth) in proportion to these signals. If the operator reacts by moving the input device back or forth, she feels the effective inertia of the remote manipulator. Thus the force reflectance loop is closed only around the robot system located at the remote site.

C. Control Architecture

The output from the task level to the servo-level is made up of desired motions and/or forces as is depicted in FIG. 4. These motion and/or force commands must be actually executed on the robot. In the absence of contacts, the controller must track position trajectories. In the presence of contacts, there are certain directions along which motion trajectories are specified, while along the others, force trajectories are specified. The fundamental assumption in a hybrid task representation is that frictional effects are negligible. Under such conditions, a pure hybrid control strategy can be used for execution of the commands.

Figure 7:
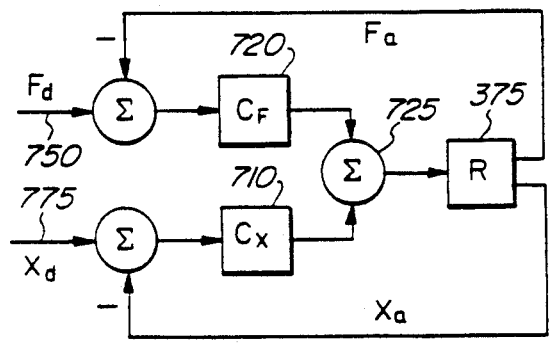
FIG. 7 is a figure depicting a pure hybrid control in accordance with the invention.

FIG. 7 shows a hybrid position/force control architecture, in accordance with that described by Raibert, M. H., & Craig, J. J., *Hybrid Position/Force Control of Manipulators*, Journal of Dynamic Systems, Measurement & Control, 102 (June 1981), 126–133. In FIG. 7, errors in position are compensated for by the controller 710 denoted $C_X$, while force errors are compensated for through a force compensator 720 denoted $C_F$. The outputs of both $C_X$ and $C_F$ represent actual motor current signals. These are directly added by an adder 725 and supplied to the robot 375.

$C_X$ and $C_F$ are position and force compensators respectively. These may be of any conventional design. For example, if the system is linearized, these could be directly obtained through pole placement, or designs to adapt to small geometric errors in the contact, or designed to minimize the flow of energy at the contact and so on. Such designs are well known in this art and are not believed to require any further description.

During implementation, we must bear in mind that each trajectory specified from the task level must be followed. One way to emulate this is to take the force/motion trajectory specified in $0_{15}$ (denoted shared output in FIG. 4), and perform interpolations by slicing it into small incremental regions consisting of ramps or steps. Each incremental $\delta \alpha$ specifies a small change in the state of the robot so that when accumulated over all the increments, changes specifies by $\alpha$ are achieved. And, each $\delta \alpha$ will be added on to the previous alpha values to generate the present $F_d$ and $X_d$ signals present at 750 and 775 of FIG. 7. That is, for k=1 to n, where n is the total number of interpolations required:

$$X_d(K+1) = X_d(K) + \delta a_{SM}$$

$$F_d(K+1) = F_d(K) + \delta a_{SM}$$

And, $X_d(0)$ and $F_d(0)$ are known before starting the task.

In this subsection, we have explained in detail (i) how teleoperator inputs are generated, (ii) how task-level feedback is reflected to the teleoperator, and (iii) how each shared task command may be executed. In the next section, we will describe in somewhat more detail the shared control architecture which is representative of an implementation of the shared control of this, our invention.

The implementation will consist of the hardware and the software environment; and a particular way in which shared control is implemented.

3.0 HARDWARE

Figure 8:
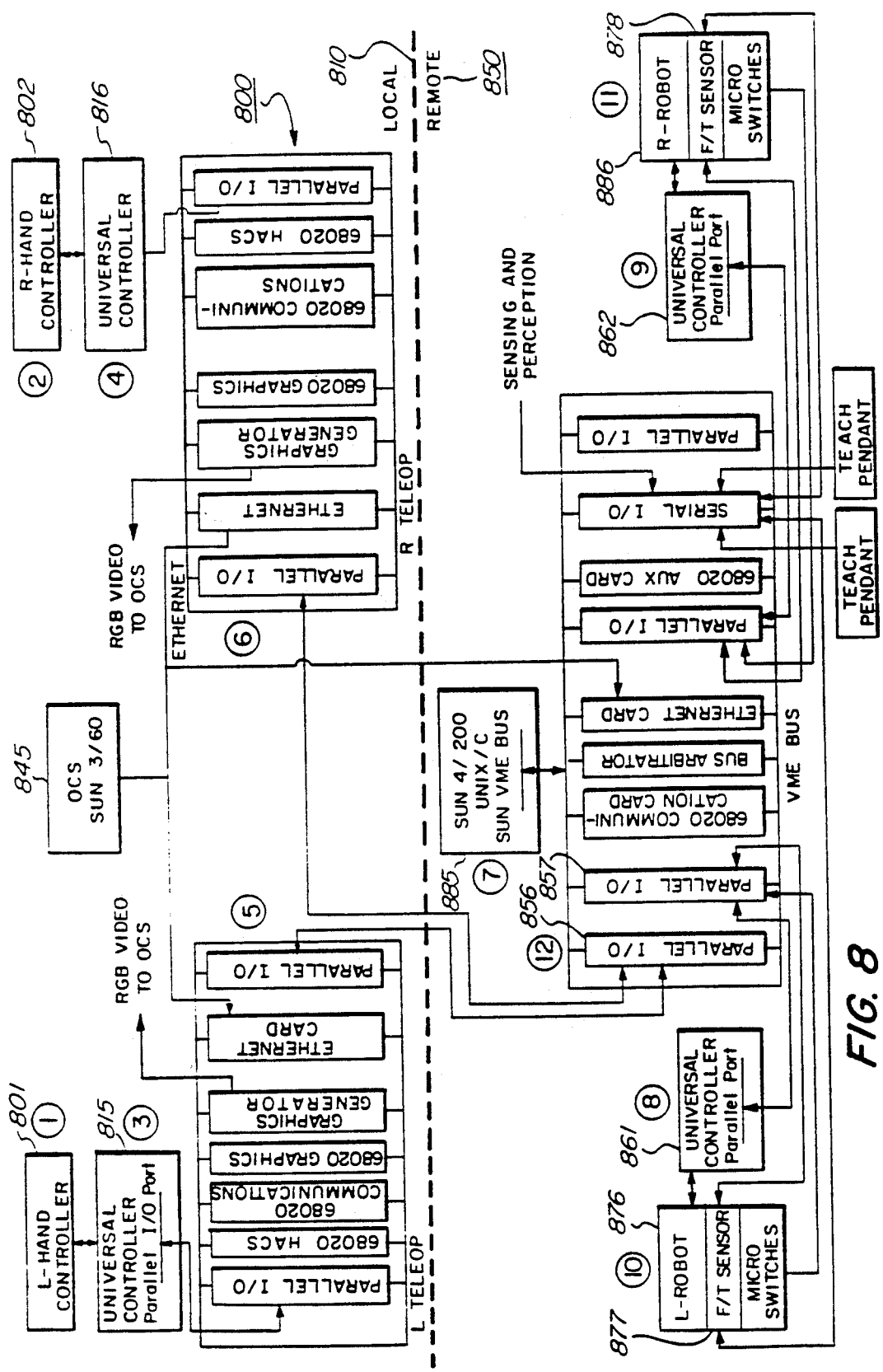
FIG. 8 is a figure depicting a traded and shared control implementation architecture in accordance with the invention.

The hardware as shown in FIG. 8 is divided into two groups: local 800 above the dashed line 810 and remote 850 below the dashed line 810. In local site 800, there is a pair of six DOF hand controllers, shown as right and left hand controllers 801, 802 respectively. These hand controllers may be in accordance with the description given in Bejczy, A. K., Salisbury, J. K., *Controlling Remote Manipulators through Kinesthetic Coupling*, Computers in Mechanical Engineering, Vol. 2, No. 1, July 1983, pages 48-60.

These hand controllers appear at encircled numerals 1 and 2 in FIG. 8. Shown at encircled numerals 3 and 4 in FIG. 8 are a pair of associated Universal Motor Controllers ("UMC") 815 and 816. The universal motor controllers 815 and 816 are connected to two VME chassis, each with two Motorola 68020/68881 based single board computers, I/O cards, and Ethernet cards (marked at encircled numerals 5 and 6 in FIG. 8. Items shown associated with the encircled numerals 1 through 6 form the hardware support for a standard teleoperation control over a robot. All operations from, and/or to, the actual tele-operator (and visa-versa) transformation boxes T and $\mathfrak{J}$ on the local side are performed by this hardware. A Sun 3/60 work station 845 serves as the programming environment (see next subsection) and as an on line operator interface to invoke different modes of operation.

In general, real time signals are transmitted by using parallel I/O and non real time command invocations are through the use of ethernet based sockets. Autonomous commands are generated here.

The hardware of the remote site consists of a Sun 4/200 computer 885 (marked at encircled numeral 7 in FIG. 8), a VME chassis with two Motorola 68020/68881 based single board computer and serial/parallel I/O cards 856, 857 (marked 12 in FIG. 8), two UMC's 861,862 (marked at encircled numerals 8 and 9 in FIG. 8), two Puma 560's, identified as left robot 876 and right robot 886 and two Lord wrist force/torque sensors 877 and 878 (marked at encircled numerals 10 and 11 in FIG. 8).

All hand controllers are equipped with DC motors and encoders. The operator's hand motions are measured through the displacements it causes in the hand controller's joints using simple kinematic relations. Force feedback is possible since the hand controllers are equipped with joint motors. The hand controllers are balanced such that the operator can let go of them without the assembly dropping due to gravity. Each hand controller, in addition to providing a general six DOF motion specification capability, has three general purpose buttons and a trigger that is used for opening or closing a gripper, indexing, or any other user-defined function.

The UMC's may be those built at Jet Propulsion Laboratories in accordance with an article by: Bejczy, A. K., Szakaly, Z. F., *A Synchronized Computational Architecture for Generalized Bilateral Control of Robot Arms*, Proc. of the Conference on Advances in Intelligent Robotic Systems, SPIE & International Society for Optical Engineering, Cambridge, MA., No. 1-6, 1987. and Bejczy, A. K., Szakaly, Z. F., *Universal Computer Control System (UCCS) for Space Telerobots*, Proc. of the 1987 *IEEE International Conference on Robotics & Automation*, Raleigh, NC, Mar. 30-Apr. 3, 1987, pages 318-324. Such articles disclose general purpose motor controllers consisting of custom joint interface cards for reading the encoders and a multi-bus based National Semiconductor 32016 single board computer for servo control.

Each UMC is a stand alone robot controller with a capability to use additional microprocessors for multiprocessing. In our implementation a second NSC32016 with an onboard parallel port serves as a communication processor. This parallel port is connected to a VME based commercial parallel card. The overall system has four such connections; two in the remote site and two in the local site. The UMC's are used to send either position or voltage commands to the puma's or the hand controllers and read their encoders and potentiometer (in the case of Puma arms). When position set points are given to the UMC's, real time PID control is performed at the rate of 1000 Hz. The communication protocol which supports an array of commands and information gathering functions can be executed at the same 1000 Hz as well.

4.0 SOFTWARE

In this section we first describe the software environment that supports our implementation. Then we provide the details specific to the implementation of shared control.

There are three different software environments each identifiable with a particular hardware module. These are: UMC, VME/68020, and the Sun 4/200 software environments. In our implementation, the UMC's are considered black boxes with a predefined communication protocol.

The programming environment is IBM-PC for code development, cross compilation, and down loading. All the code is in NSC32016 assembly language. The VME/68020 uses a commercial software development package called VxWorks. This package provides all the necessary tools to write, down load, and debug code on the 68020's. The package can use one of several commercial real time kernels.

All the communication and 68020 software are written in the C language. The Sun 4/200 runs on a modified Sun 3.2 operating system which provides a real time kernel capability. The programming language is C. The autonomous portion is written in an enhanced (dual arm) version of Robot Control C Library (RCCL) pertaining to: Hayward, V., Paul R., *Robot Manipulator Control Under Unix RCCL*, International Journal of Robotics Research, Vol. 5, No. 4, pages 94-111, Winter 1987 and Lloyd, J., Parker, M., McClain, R., *Extending the RCCL Programming Environment to Multiple Robots & Processors*, Proc. 1988 IEEE International Conference on Robotics & Automation, Apr. 24-29, Philadelphia, PA, pages 465-469.

Now we describe the implementation of shared control. The teleoperation portion of the control, i.e., forward kinematics and transformation to the robot base coordinate frame are performed in the local site (functions on the local side in FIG. 6 are implemented on hardware items marked by encircled numerals 1 through 6 in FIG. 8). Force feedback to the operator is also implemented in the local site. The task level share control is performed on the Sun 360 in the R programming environment.

RCCL is general purpose robot library that provides a convenient programming environment. Since the user writes her code in the C language and makes use of RCCL library functions, the programs are not restricted to a specific syntax such as VAL or other special purpose robot languages. The user writes two pieces of code for each robot program.

The first part, which runs asynchronously with the robot, is the main logic of the program, such as when to start, how fast to move, Cartesian verses joint mode trajectory generation, etc. . . . The second part, which runs in real time, computes the user supplied real time functions. These real time functions can be tied to an external sensor such as a vision subsystem or force torque sensor, or an internal real time system such as joint sensors. Task level shared control is implemented using this capability of RCCL.

After the autonomous trajectories are determined from the task description, a ring equation of the form:

$$(Z \ldots) T6(\ldots R) = AB \ldots U$$

In every interval i.e., a time period during which R computes a new position set point, equation (3) is solved for T6. T6 is the transformation describing the sixth frame robot. All other matrices have to be determined before hand. Normally, the autonomous system generates plans which end up providing via point for the manipulator to pass through. In terms of the above equation, this means that matrices such as Z, . . . , U are determined by the autonomous system. One or more of these matrices can be attached to the output of the hand controllers. In this manner, the system can effectively mix the data from these two separate paths. This data can first go through appropriate filters so only the specified subspace affects the motion of the robot.

The output of this portion can then be given to the level 0 which actually performs the servo control. Similar but simpler mechanism is used to mix the force trajectories. It is simpler, since at the present we consider very simple (step function) trajectories for force control.

The servo control is performed in two 68020 CPU's in the remote site (box 12). Since the Sun 4/200 computer can compute the kinematics and dynamics equations 7 to 8 times faster than the 68020/68881 processors, most of the computational elements that do not need servo level updates reside in the Sun 4/200 computer. These include the Jacobian, inverse Jacobian, and some of the elements of the arm dynamics. The Sun 4/200 updates this data and computes the position and force set positions at the rate of 150 Hz. The servo level runs at 300 Hz.

In this patent application we have presented an architecture for shared control in two levels of a control hierarchy. Our philosophical approach to the invention includes a signal sharing that has retained the advantages of each mode while allowing for one's deficiencies to be overcome by the other. Particular emphasis was placed on the control of a remotely located robot in the presence of transmission time delays. The architecture provides a flexible system design such that one can start on an almost completely teleoperated mode and move towards increased autonomy in time.

Other applications of the principles and features of this invention will be well recognized to those of ordinary skill in this art and need no further description. The principles described and claimed hereinafter are to be construed in accordance with the applicable construction and interpretation tenets of the Patent Laws.

What is claimed is:

1. A hierarchical robotic control system for controlling a robot located at a remote site which is remotely located from a point of command over said robot at a local site, which robotic control system experiences communication time delays between said local and remote sites and shares autonomous and teleoperator hand-controller ("teleoperator") commands including motion and force, a task trajectory for performing a given task, and a teleoperator trajectory as directed by a teleoperator for remotely performing said given task, all expressed as individual command signals applied to and fed back from said control system, with said commands being implemented in said control system in a task level and in an execution level, said robotic control system comprising:

a task level including means for controlling said robot in motion and force, task trajectories, and/or teleoperator trajectories in said task level to control tasks being performed by said robot;

an execution level including means at said local site for transforming teleoperator command signals which are subjected to said communication time delays from a local coordinate system at said local site to the coordinates being used as task level commands at said robot's remote site; and a combined command signal selection and signal mixing means at the remote site for varying the effectiveness in autonomous control over said robot by said communication time delayed teleoperator command signals in accordance with the length of communication time delays said teleoperator command signals experience in travelling between said local and said remote sites.

2. A control system in accordance with claim 1 wherein the time delays introduce detrimental effects into said robotic control system and sharing of control by said combined signal selection and mixing means minimizes detrimental effects, and wherein said system's signal selection and mixing means further comprises:

weighted signal mixing means at the task level, should the communication time delay between said local and remote sites be significant, allowing weighted mixing of teleoperator commands with said autonomous command only along motion directions, while forces are controlled only autonomously.

3. A control system in accordance with claim 1 wherein said robotic control system commands actual robot motion/force via a modified signal command as modified either from a local and/or a remote site, and said system's weighted signal mixing means further comprises:

signal mixing matrices at the task level for deciding when, what and how much of the teleoperator command signals from said remote and/or said local site are to be effective in forming combined modified commands for actual control over said robot.

4. A control system in accordance with claim 3 wherein said sharing of control minimizes the detrimental effects caused by the communication time delays, and wherein said combined signal selection and mixing matrices further comprises:

a signal selection matrix for selecting which of said autonomous and/or said teleoperator command signals will be effective in contributing to said modified signal commands for actual control over said robot.

5. A control system in accordance with claim 3 wherein said sharing of control minimizes the detrimental effects caused by the communication time delays, and wherein said signal mixing matrices further comprises:

signal weighting matrices for determining how much of any command signal(s) actually reaches the robot and what share of such signals will contribute to said modified command signal(s) that have actual control over said robot.

6. A hierarchal robot control system for a robot in which teleoperator and/or autonomous commands trade and share control over a robot and said commanded control is distributed over a remote site and a local site, with task-level and servo-control occurring solely at said remote site to actually drive said robot in motion/force at said remote site, said robot control system comprising:

an autonomous planner;
means responsive to said autonomous planner for developing a series of task-level execution commands;
a task-level sharing means located at the remote site for receiving commands from said autonomous planner;
a source of teleoperator commands;
means for transmitting teleoperator commands to the sharing means for mixing the teleoperator commands with autonomous commands for application to said robot control system;
a separation means separate and distinct from said sharing means; and
means for feeding back to said teleoperator at the remote/local site information about actual robot motions, end-effector contact and inertial forces taking place at said remote site from a shared combination of teleoperator and autonomous commands.

7. A hierarchal control system for robot control in accordance with claim 6 in which control is distributed over a remote site and a local site, and further comprising:

means available to a teleoperator at said local site for generating teleoperative inputs as deemed necessary by said planner at said remote site for performing mixed correction commands for control over said robot at said remote site.

8. A method of shared control over a robot separated from an autonomous command location by varying amounts of communication time delays for teleoperator command signals employed in said shared control, said method compensating for differences in communication time delays by the method steps of:

dividing control architecture for controlling said robot into a task level and an execution level;
supplying command input signals in a task coordinate system as a task coordinate input command, a task trajectory input command, and a teleoperator trajectory input command;
employing a hybrid position/force task representation for low-level tasks, whereby the task coordinate system consists of orthogonal motion and force coordinates, a task trajectory and teleoperator trajectories of appropriate motion and force; and
compensating for said communication time delays by altering the teleoperator trajectory in accordance with the length of time delays actually encountered for said teleoperator commands so that the robot is controlled free of inaccuracies which tend to be introduced into control because of said communication time delays.

9. A method of control in accordance with claim 8 and further comprising in said compensating step the additional method step of:

removing from said teleoperator, based upon the amount of communication time delays, any reflectance force so that motion control alone is available to the teleoperator.

10. A method of control in accordance with claim 8 wherein the control architecture is located in outer space and the teleoperator is earth based, and wherein the method includes the further steps of:

measuring the communication time delays between the local and the remote locations; and
said compensating step further includes sharing control over said robot by a mixture of autonomous and teleoperator controls.

11. A method of control in accordance with claim 10, should the communication delays exceed a predetermined minimum, which includes the further method step of:

mixing teleoperator and autonomous control at the task level only along motion directions, while mixing does not occur in force, so that forces are controlled only autonomously.

12. A method of control in accordance with claim 11 and comprising additional sub-steps of dividing the mixing step so that it consists of:

deciding what signals are to be mixed, when such signals may mix, and how effective in robot control the mixed signals will be; and
making the decision in accordance with mixing matrix entries which reflect each signal input's modality.

13. A method of control in accordance with claim 12 and further comprising the step of:

rendering the control architecture to be oblivious to the nature of the signals causing an actual trajectory at said execution level.

14. A method of control over a robot for guiding the robot's actual trajectory/force wherein the robot is remotely located from a command location which issues an autonomous command and said robot is also subject to control by a teleoperator, said method comprising the steps of:

remotely selecting an effective command for control over said robot directly from said autonomous command;

remotely selecting an effective command directly from said teleoperator;

placing entries in a mixing matrix that receives the selected commands in order to remotely select an effective command directly from a mixture of the selected commands without either the autonomous or the teleoperator being aware of their contribution to the total command that controls the robot; and mixing the selected commands in accordance with the entries in the mixing matrix.

15. A method of control in accordance with claim 14 and further comprising the step of:

sharing actual robot control by mixing the teleoperator and autonomous input modalities.

16. A method of control in accordance with claim 15 wherein the robot exhibits a nominal autonomous and a nominal teleoperator behavior, and said method further comprises the step of sharing control by:

(1) either the nominal autonomous behavior may be modified by a teleoperator, or (2) the nominal teleoperator behavior may be modified autonomously, and (3) accomplishing approaches (1) and (2) by doing the modifying in selection/mixing matrices.

17. A method of control in accordance with claim 16 and further comprising the steps of:

modifying nominal autonomously planned motion trajectories by a teleoperator in order to track unmodelled target motions in the autonomously planned motion; and modifying nominal teleoperator motions through compliance to accommodate geometric errors autonomously in motions being controlled by the teleoperator.

18. A method of control in accordance with claim 17 wherein the robot being controlled is located in outer space and the teleoperator is earth based such that communication between the teleoperator and the robot experiences communication time delays that introduce detrimental effects in control over the robot, and wherein the method includes the further steps of:

sharing control in accordance with the length of the communication time delays in order to minimize the detrimental effects caused by the communication time delays between outer space and earth.

19. A method of control in accordance with claim 18, should the communication time delay exceed a predetermined minimum, which includes the further step of:

allowing mixing of teleoperator and autonomous control at the task level only along motion directions, while forces are controlled only autonomously.

20. A method of control over a robot which may operate in one of three modes, i.e. moving freely, or just about to establish contact, or else, may have already established stable contact, wherein a robot and a command station are in an environment that introduces time delay between command and actual controlled movement in motion/force at said robot, the method comprising:

operating control over said robot by a shared system;

autonomously providing nominal task trajectories;

allowing said nominal task trajectories to be modified by the teleoperator only in those directions where contact is not established; and performing force control autonomously while the teleoperator is affecting the nominal task trajectories in the absence of contact.

21. A hierarchical robotic control system operating in accordance with the method of claim 20 for controlling a robot located at a site which is remote from the point of command at a local site, which system shares autonomous and hand-controller ("teleoperator") commands that are implemented in a task level and in an execution level, said control method further characterized by the steps of:

establishing a task level for controlling said robot in response to orthogonal motion and force coordinates, task trajectories, and a teleoperator trajectory;

expressing command signals in said task level to control tasks being performed by said robot;

establishing an execution level at a local site which is remote from said robot's location;

transforming teleoperator signals from a local coordinate system at said local site to the coordinates being used as commands in said task level at said robot's remote site; and weighting the effectiveness in control over said robot by said teleoperator signals in accordance with the length of the communication time delays between said local and said remote sites.

22. A method of control in accordance with claim 21 wherein said control system includes detrimental effects caused by communication time delays, and sharing of control minimizes such detrimental effects, and wherein said method further comprises the steps of:

allowing, should the communication time delay between said local and remote sites be significant, integration of teleoperator commands only along motion directions, while controlling forces only autonomously.

23. A control system and method of control in accordance with claim 22 wherein said method further comprises:

forming modified command signals for controlling said robot by said modified command signals only;

deciding by signal mixing matrices at the task level when, what and how much of the command signals from the remote and the local sites are to be effective in the formation of said modified commands; and passing the command signals through mixing matrices, in order to formulate said modified commands for control of said robot as a modified signal output from said mixing matrices.

24. A control system and method of control in accordance with claim 23 wherein said method further comprises:

the communication time delays in transmission causes the robot to deviate away from its desired path;

such communication time delay in a return transmission path causes the feedback information to be obsolete resulting in errors in the specification of a desired path for the robot to follow; and compensating for instabilities in the control system which results from both transmission delay and obsolete feedback information.

25. A control system and method of control for motion and force of a contact type by a robot in accordance with claim 24 wherein said method further comprises:
   sharing signal control over said robot, at the task level, as follows;
   let the robot's motions and forces allowable by the contact type to be represented by 6×1 vectors M and F;
   let M(i) represent the $i^{th}$ row of M, then:
   M(i)=1, if motion freedom exists, =0 otherwise.

26. A control system and method of control in accordance with claim 25 wherein said method further comprises:
   similarly, F(i) is 0 or 1 depending on whether force freedom in that direction exists or not.

27. A control system and method of control in accordance with claim 26 wherein said method further comprises:
   a standard for a hybrid task representation expressed as:

$$F^T M = 0.$$

28. A control system and method of control in a task coordinate system in accordance with claim 26 wherein said method further comprises:
   also, let $a_M$ and $a_F$ represent desired motion and force trajectories, said method being further characterized in that;
   said task coordinate system is represented by $$^t_b T.$$

and the corresponding Jacobian, $$^t_b \Im$$

29. A control system and method of control in accordance with claim 26 and further comprising:
   implementation of said method by a feedforward loop for feeding command information to said robot to be controlled and a feedback loop for feeding back response information about the robot's actual movements as sensed at said robot.

30. A control system and method of control in accordance with claim 29 and further comprising:
   input and output signals in said feedforward loop, with said input and output signals being at the task level, and consisting of the following components:

autonomous input $(I_A) \leftarrow (^t_b T, ^t_b \Im, M, F, (a_{AM}), (a_{AF}))$ teleoperator input $(I_T) \leftarrow (a_{TM}, a_{1TF})$ shared Output $(O_s) \leftarrow (a_{SM}, a_{SF})$ where ← indicates what information is contained in a feedforward command in said feedforward loop.

31. A control system and method of control in accordance with claim 30 and wherein said matrices are mixing matrices and are the method is further characterized by the method step of:
   mapping of $I_A$ and $I_T$ onto $O_s$ as follows;
   let $\pi_M$ be a 6×6 matrix (and $\pi_M(i,i)$ be a matrix element at the $i^{th}$ row and column of the matrix).

32. A control system and method of control in accordance with claim 31 and wherein said mixing matrices are further characterized by the method step of:
   deriving and implementing, for each of the permissible degrees of freedom of robot motion, the $\pi$ matrices as follows:

$$\Pi_M(i, i) = 1, \text{ if } M(i) = 1$$
$$= 0 \text{ otherwise}$$
$$\Pi_M(i, j) = 0, \text{ when } i \neq j.$$

33. A control system and method of control in accordance with claim 32 and wherein commands for force and motion are applied to force and motion mixing matrices, and said force/motion mixing matrices are further characterized by the method step of:
   specifying entries in the $\pi$ matrices which reflect a desired effect of task representation on shared signal control over said robot; and
   specifying what is being mixed along a particular direction of motion by entries in said matrix.

34. A control system and method of control in accordance with claim 33 and wherein said mixing matrices are further characterized by the method step of:
   sharing signal terms in a feedforward loop established in the matrix (with these stated conditions) as given below:

$$A_{SM} = ^0_1 T[\Omega_{AM} \Pi_M a_{AM} + \Omega_{TM} \Pi_M a_{TM}] \quad (1)$$

$$A_{SF} = ^0_1 T[\Omega_{AF} \Pi_F a_{AF} + a_{TF} \Pi_F a_{TF}] \quad (2)$$

whereby equations (1) and (2) completely determine C in a feedforward direction in said feedforward loop.

35. A control system and method of control in accordance with claim 31 and wherein said mixing matrices also receive force commands in a force matrix, and said method is further characterized by the method step of:
   $\pi_F$ for said force matrix wherein entries in said force matrix are constructed as $$\Pi_F(i, i) = 1, F(i) = 1$$
$$= 0 \text{ otherwise}$$
$$\Pi_F(i, j) = 0, \text{ when } i \neq j.$$

36. A control system and method of control in accordance with claim 31 and wherein said mixing matrices are further characterized by the method step of:
   implementing motion and force sharing in weighing matrices which are designated $\Omega$ (motion and force), and wherein said $\Omega$ matrices are determined as follows;
   $(\Omega(i,i))$ is a matrix element located at the $i^{th}$ row and column of said matrix.

37. A control system and method of control in accordance with claim 36 and wherein said mixing matrices are further characterized by the method step of:
   summing output signals which are emitted from said matrices in summation circuits connected to the feedforward and the feedback loops.

38. A control system and method of control in accordance with claim 31 and wherein said mixing matrices are further characterized by the method step of:
 choosing in M and F, some directions for operation under pure teleoperation or pure autonomy, or a mixture of both.

39. A control system and method of control in accordance with claim 38 and wherein said mixing matrices are further characterized by the method step of:
 achieving pure autonomy and pure teleoperation within the robot control system by setting W equal to 1 and W equal to 0, respectively.

40. A control system and method of control in accordance with claim 31 and wherein said mixing matrices are further characterized by the method step of:
 let these be denoted by $6 \times 1$ vectors $G_T$ and $G_A$, wherein $(G_T(i))(G_A(i))$ is equal to 1 if and only if pure teleoperation (autonomous control) is intended in any given direction which is designated as direction i.

41. A control system and method of control in accordance with claim 31 and wherein said mixing matrices are further characterized by the method step of:
 define matrix elements which form the $\Omega$ matrices as follows:

$$\Omega_{AM}(i,i) = W_{iM}; \text{ if } M(i) = 1 \ \& \ G_T(i) \neq 1$$
$$= 0; \text{ otherwise}$$
$$\Omega_{AM}(i,j) = 0; \text{ for } i \neq j$$
$$\Omega_{TM}(i,i) = (1 - W_{iM}); \text{ if } M(i) = 1 \ \& \ G_A(i) \neq 1$$
$$= 0; \text{ otherwise}$$
$$\Omega_{TM}(i,j) = 0; \text{ for } i \neq j$$
$$\Omega_{AF}(i,i) = W_{iF}; \text{ if } F(i) = 1 \ \& \ G_T(i) \neq 1$$
$$= 0; \text{ otherwise}$$
$$\Omega_{AF}(i,j) = 0; \text{ for } i \neq j$$
$$\Omega_{TF}(i,i) = (1 - W_{iF}); \text{ if } F(i) = 1 \ \& \ G_A(i) \neq 1$$
$$= 0; \text{ otherwise}$$
$$\Omega_{TF}(i,j) = 0; \text{ for } i \neq j$$

where, W denotes the weight assigned as entries in the elements of said matrices, and
noting that the elements in the $\Omega$ matrices will, in general, be diagonally arranged.

42. A control system having an autonomous planner and a teleoperator, and a method of control using feedforward and feedback signal commands through the control system in a feedforward path and a feedback path, and said control system comprising:
 a feedforward path having input and output signals at a task level, with said signals consisting of the following components:

autonomous input $(I_A) \leftarrow ({}^t_bT, {}^t_b\mathfrak{S}, M, F, (\alpha_{AM}), (\alpha_{AF}))$ teleoperator input $(I_T) \leftarrow (\alpha_{TM}, \alpha_{TF})$ shared Output $(O_s) \leftarrow (\alpha_{SM}, \alpha_{SF})$ where $\leftarrow$ indicates what signal information is contained in a feedforward command in said feedforward path; and task level sharing circuitry; and
 means for inputting actual motions/forces into said feedback path through said task level sharing circuitry in order to generate a motion/force feedback signal for an autonomous planner and a force reflectance signal for said teleoperator.

43. A control system and method of control in accordance with claim 42 and further comprising:
 an autonomous planner which expects the system to track only the autonomous part $I_{1A}$, which expectation would result in an incorrect reasoning (upon completion of a commanded task) by the autonomous planner.

44. A control system and method of control in accordance with claim 43 wherein the control system controls a robot by an actual control signal formed by sharing control between an autonomous planner command and a teleoperator command, and further comprising:
 the method step of compensating for the fact that the autonomous planner does not know that the actual control signals that are controlling the robot have been a shared command developed from said teleoperator command and said autonomous planner command.

45. A control system and method of control in accordance with claim 44 characterized in that what is actually being tracked is not solely an autonomous input command but rather is a shared command, and further wherein
 the autonomous planner may conclude that task execution has failed; and
 providing a means in conjunction with said autonomous planner for compensating in the autonomous planner for the shared command.

46. A control system and method of control in accordance with claim 45 and further comprising a task specification for said autonomous planner, and said control system further comprises:
 means for modifying the task specification of the autonomous task planner from $I_{1A}$ to $O_{1S}$, wherein $O_{1S}$ is a signal representing a shared motion/force trajectory that is applied to said compensating means for said autonomous planner.

47. A control system and method of control in accordance with claim 46 and further comprising:
 means assuring that under pure teleoperation, said task planner specifications are derived from the teleoperator completely and not from any autonomous or mixed autonomous and teleoperator operation.

48. A control system and method of control in accordance with claim 42 and further comprising the step of:
 formulating in signal weighting matrices the signals that are applied through said task level sharing means in accordance with the mathematical relationship as follows:

$$\Lambda_{AM}(i,i) = 1; \text{ if } M(i) = 1$$
$$= 0; \text{ if } M(i) = 0$$
$$\Lambda_{AM}(i,j) = 0; \text{ for } i \neq j$$
$$\Lambda_{AF}(i,i) = 1; \text{ if } F(i) = 1$$
$$= 0; \text{ if } F(i) = 0$$
$$\Lambda_{AF}(i,j) = 0; \text{ for } i \neq j$$

$$\Lambda_{TF}(i, i) = \lambda_F^2; \text{ if } F(i) = 1$$
$$= 0; \text{ if } F(i) = 0$$
$$\Lambda_{AF}(i, j) = 0; \text{ for } i \neq j$$

where $\lambda_i$ reflects the scaling factor between the actual forces generated and said force reflectance signal that the teleoperator is intended to feel.

49. A control system and method of control in accordance with claim 48 and further comprising the additional step of:

providing force reflectance of the actual forces to said teleoperator.

50. A control system and method of control in accordance with claim 49 and further comprising;

means for developing a virtual force reflectance signal for said teleoperator as defined by;

$$(G_A)^t G_T = 0$$

$$G_A U G_T = S_M$$

where, U indicates a union operation and $S_M$ represents a space of motions allowable by M.

51. A control system and method of control in accordance with claim 48 and further comprising an additional step of:

providing force reflectance by an open-loop, wherein said teleoperator just feels contact of said robot as a reflectance force.

52. A control system and method of control in accordance with claim 48 and further comprising the additional step of:

providing force reflectance by a closed-loop through said feedforward and said feedback paths whereby said teleoperator can effect changes in the desired contact force through teleoperation.

53. A control system and method of control in accordance with claim 52 and further comprising the additional step of:

employing said closed loop only when time delays between a feedforward and a resulting feedback signal are insignificant.

54. A control system and method of control in accordance with claim 48 and further comprising an additional steps of:

developing an inertial term $\Lambda_{TM}$ by summing a weighted matrix signal with a modified Motion/Force signal that actually controls the robot;

enabling the teleoperator, via said inertial signal, fed back to said teleoperator by said feedback path, to experience the inertia of the robot system at the remote site; and allowing said teleoperator, through such enabling, to get a sense of how the robot is behaving.

55. A control system and method of control in accordance with claim 54 and further comprising, via the term $\Lambda_{TM}$ an additional step of:

enabling said teleoperator to adapt to the inertial characteristics of the robot system, so that the teleoperator learns how best to teleoperate the robot.

56. A control system and method of control in accordance with claim 55 and further comprising, via the term $\Lambda_{TM}$ an additional step of:

reflecting, in the presence of contacts along directions of contact forces, actual forces back to the teleoperator (as modified by a scaling factor as defined in claim 48 ).

57. A control system and method of control in accordance with claim 54 and further comprising, via the term $\Lambda_{TM}$ an additional step of:

obtaining along directions of motions, a difference between the desired and actual teleoperator trajectories; and using said difference to inform said teleoperator about the inertial characteristics of the robot.

58. A control system and method of control in accordance with claim 54 and further comprising;

restricting teleoperative and autonomous motions in the orthogonal directions, so, $\Lambda_{TM}$ will be defined as:

$$\Lambda_{TM}(i, i) = 1; \text{ if } M(i) \times G_T(i) = 1$$
$$= 0; \text{ otherwise}$$
$$\Lambda_{AM}(i, j) = 0; \text{ for } i \neq j.$$

* * * * *